US012599154B2

(12) United States Patent (10) Patent No.: US 12,599,154 B2
Hibino (45) Date of Patent: Apr. 14, 2026

(54) BEVERAGE

(71) Applicant: Givaudan, S.A., Vernier (CH)

(72) Inventor: Atsushi Hibino, Tokyo (JP)

(73) Assignee: GIVAUDAN SA, Vernier (CH)

( * ) Notice: Subject to any disclaimer, the term of this patent is extended or adjusted under 35 U.S.C. 154(b) by 994 days.

(21) Appl. No.: 15/519,929

(22) PCT Filed: Oct. 21, 2015

(86) PCT No.: PCT/EP2015/074308
§ 371 (c)(1),
(2) Date: Apr. 18, 2017

(87) PCT Pub. No.: WO2016/062743
PCT Pub. Date: Apr. 28, 2016

(65) Prior Publication Data
US 2017/0325485 A1 Nov. 16, 2017

(30) Foreign Application Priority Data
Oct. 23, 2014 (GB) ..................................... 1418848

(51) Int. Cl.
*A23L 2/56* (2006.01)
*A23L 27/00* (2016.01)
*A23L 27/12* (2016.01)

(52) U.S. Cl.
CPC ................. *A23L 2/56* (2013.01); *A23L 27/12* (2016.08); *A23L 27/88* (2016.08)

(58) Field of Classification Search
CPC ............. A23L 2/56; A23L 27/88; A23L 27/12
USPC ........................................................ 426/590
See application file for complete search history.

(56) References Cited

U.S. PATENT DOCUMENTS

| | | | | |
|---|---|---|---|---|
| 2,893,583 A | * | 7/1959 | Achtziger | A47G 19/23 |
| | | | | 215/10 |
| 4,368,213 A | * | 1/1983 | Hollenbach | A23C 9/1528 |
| | | | | 426/590 |
| 5,178,892 A | * | 1/1993 | Simmons | C11C 3/006 |
| | | | | 426/533 |
| 5,583,019 A | | 12/1996 | Barclay | |
| 5,783,247 A | * | 7/1998 | Van Der Heijden | A21D 13/16 |
| | | | | 426/650 |
| 5,882,703 A | | 3/1999 | Barclay | |
| 6,245,365 B1 | | 6/2001 | Barclay | |
| 6,319,698 B1 | | 11/2001 | Barclay | |
| 7,157,254 B1 | | 1/2007 | Akimoto et al. | |
| 2001/0016218 A1 | | 8/2001 | Barclay | |
| 2002/0037561 A1 | | 3/2002 | Barclay | |
| 2004/0248266 A1 | | 12/2004 | Barclay | |
| 2007/0009642 A1 | * | 1/2007 | Yamaguchi | C11C 3/006 |
| | | | | 426/601 |
| 2007/0026050 A1 | | 2/2007 | Barclay | |
| 2007/0077637 A1 | | 4/2007 | Akimoto et al. | |

| | | | |
|---|---|---|---|
| 2007/0077638 A1 | | 4/2007 | Akimoto et al. |
| 2007/0099279 A1 | | 5/2007 | Akimoto et al. |
| 2007/0116819 A1 | | 5/2007 | Prakash et al. |
| 2008/0044388 A1 | | 2/2008 | Barclay |
| 2008/0044389 A1 | | 2/2008 | Barclay |
| 2008/0153142 A1 | | 6/2008 | Kawashima et al. |
| 2009/0018186 A1 | * | 1/2009 | Chen ...................... A23L 2/395 |
| | | | 514/458 |
| 2011/0117262 A1 | | 5/2011 | Ino et al. |
| 2013/0202764 A1 | | 8/2013 | Prakash et al. |
| 2013/0309362 A1 | | 11/2013 | Bromley |
| 2014/0205730 A1 | | 7/2014 | Abril et al. |

FOREIGN PATENT DOCUMENTS

| | | | |
|---|---|---|---|
| EP | | 1 122 304 A1 | 8/2001 |
| EP | | 1 801 225 A1 | 6/2007 |
| EP | | 2 311 326 A1 | 4/2011 |
| WO | WO 2008/022131 | A1 | 2/2008 |
| WO | 01/58282 | A1 | 8/2011 |
| WO | WO 2013/120025 | A1 | 8/2013 |

OTHER PUBLICATIONS

Conaboy, Is Soup a Beverage Or a Food, Nov. 27, 2017; accessed at https://theoutline.com/post/2513/is-soup-a-beverage-or-a-food (Soup) (Year: 2017).*
Philips, Drink Different: Bottling gazpacho, Drinks INsight, Jun. 13, 2014 accessed at https://www.drinks-insight-network.com/features/featuredrink-different-4293265/ (Year: 2014).*
Jscooks, Jewish Plum Soup with Sour Cream, Food 52, Aug. 1, 2010 accessed at https://food52.com/recipes/6083-jewish-plum-soup-with-sour-cream (Year: 2010).*
Tuscan Soybean Soup, Feasting at Home, Oct. 23, 2015 accessed at https://www.feastingathome.com/ribollita-recipe/ (Year: 2015).*
Anon, How to Make Bone Broth and Avoid Rancid Fat, Eat Beautiful, https://eatbeautiful.net/how-make-bone-broth-avoid-rancid-fat/ (Year: 2014).*
Liz, The Silver Palate's Carrot and Orange Soup, Virtually Homemade, Nov. 2012 http://www.virtuallyhomemade.com/2012/11/silver-palate-carrot-orange-soup.html (Year: 2012).*
PCT/EP2015/074308—International Search Report, mailed Jan. 18, 2016.
PCT/EP2015/074308—International Written Opinion, mailed Jan. 18, 2016.
Great Britain Search Report—GB1418848.6, Apr. 13, 2015.
Bigogno, Chiara, et al., "Lipid and Fatty Acid Composition of the Green Oleaginous Alga *Parietochloris incisa*, The Richest Plant Source of Arachidonic Acid", Phytochemistry, vol. 60, No. 5, Jul. 1, 2002, pp. 497-503.
Anonymous, "Arachidonic Acid Single-Cell Oil (ARA)", Technical Evaluation Report, Compiled by ICF International for the USDA National Organic Program, pp. 1-26, Aug. 19, 2011.

* cited by examiner

*Primary Examiner* — Nikki H. Dees
*Assistant Examiner* — Philip A Dubois
(74) *Attorney, Agent, or Firm* — Curatolo Sidoti & Trillis Co., LPA; Floyd Trillis, III; Salvatore A. Sidoti

(57) ABSTRACT

A citrus-flavoured beverage comprising a beverage base, citrus flavour and a citrus flavour-enhancing proportion of a mega-fatty complex. The addition of mega-fatty complex gives a juicier, more natural flavour to the beverage.

8 Claims, No Drawings

BEVERAGE

CROSS REFERENCE TO RELATED APPLICATIONS

This application is a national stage application of International Application No. PCT/EP2015/074308, filed 21 Oct. 2015, which claims priority from Great Britain Patent Application No. 1418848.6, filed 23 Oct. 2014, which applications are incorporated herein by reference.

This disclosure relates to citrus-flavoured beverages and to a means of obtaining a more natural- and better-tasting citrus beverage.

Citrus-flavoured beverages (particularly orange, lemon and lime) are among the most popular beverage flavours. It has long been a goal of the beverages industry to produce a citrus-flavoured beverage with more of the natural sweetness and juiciness of the fruit itself.

It has now been found that it is possible to do this by means of the use of a particular additive. There is therefore provided a citrus-flavoured beverage comprising a beverage base, citrus flavour and a citrus flavour-enhancing proportion of a mega-fatty complex.

There is additionally provided a method of preparing a citrus-flavoured beverage, comprising the addition to a beverage base of a citrus flavour and a citrus flavour-enhancing proportion of a mega-fatty complex.

By "citrus flavour" is meant a flavour derived from the fruit from plants of the genus Citrus of the family Rutaceae. Examples of these include grapefruit, lemon, orange, lime, mandarine, bergamot and pomelo. The flavour may be a completely natural flavour extracted from the plant itself, a completely synthetic flavour produced by combining individual citrus flavour-conferring substances, or a mixture of the two. There are many commercially available citrus flavours and they are used in a wide variety of comestible compositions.

By "beverage base" is meant a combination of the normal ingredients used to prepare a citrus beverage, apart from the citrus flavour and mega-fatty complex. These are standard ingredients used in art-recognised quantities, and include water, sugars and other sweetening agents, surfactants and suspending agents, thickeners, rheology modifiers, dyestuffs and colouring matters.

By "mega-fatty complex" is meant a composition prepared from an arachidonic acid-enriched single cell oil. Single cell oils (SCO) are edible oils, extracted from single-cell microorganisms, such as algae, bacteria and yeast. They have numerous uses other than use as edible oils, including precursors for biofuels.

Arachidonic acid-enriched SCOs (ARA-SCOs) are made commercially (see, for example, "Basic Biotechnology" ed. Ratledge and Kristiansen (Cambridge University Press, 2006) at p. 398). An example of a commercially-available material is ARASCO™ extracted from the unicellular fungus *Mortierella alpina* and marketed by Royal DSM, Netherlands. It is widely used in food products.

Examples of the preparation of mega-fatty complexes may be found in, for example, U.S. Pat. No. 5,178,892 and United States publication US 2007-0009642.

Given the normal uses of ARA-SCO and such complexes, it is surprising and completely unexpected that it can assist in the achievement of a superior citrus flavour is particularly surprising.

The mega-fatty complex is added to a citrus flavour typically at a weight proportion of 0.005-0.02%, particularly from 0.007-0.015%, and this flavour+mega fatty complex combination is added to a beverage at a weight proportion of 0.01-0.2%, particularly from 0.015-0.15%.

In a typical process, the mega-fatty complex is added to a citrus flavour, and mixed well. This mixture is then washed with a suitable solvent to remove any residual oily material (a typical wash solvent is an ethanol/water mixture). The solvent is then removed and the flavour filtered. It is then ready to be added to a beverage.

The use of a flavour utilizing the mega-fatty complex hereinabove in a beverage composition results in a beverage with a surprising degree of "natural" flavour.

The disclosure is further described with reference to the following non-limiting example.

EXAMPLE

A mega-fatty complex was prepared from ARA-SCO (ARASCO™ ex DSM) by the process described in Example 1 of US 2007-0009642.

95 g of a 60 (wt) % ethanol/water mixture with a temperature of −5° C. was added with stirring, and the ethanol/water phase retrieved and filtered using diatomaceous earth (Hyflo Supercell™ ex Tokyo Diatomaceous Earth Industries Co., Ltd.

A beverage base formula was prepared as follows:

| | |
|---|---|
| Fructose | 43.0 g |
| Anhydrous citric acid | 1.0 g |
| Sodium citrate | 0.35 g |
| Purified water | 955.65 g |

To samples of this beverage base were added the following at a weight concentration of 0.1%:

(i) Orange oil (ii) Orange oil containing 0.002 (wt) % mega-fatty complex (iii) Orange oil containing 0.02% mega-fatty complex (iv) Orange oil containing 0.1% mega-fatty complex The beverages were submitted to a panel of experienced testers. The testers found as follows:

(ii) indistinguishable from control (iii) juicy, fruity, natural (iv) oily, fatty Sample (i) represents a typical, commercially-available orange-flavoured beverage. The appropriate proportion of mega-fatty complex adds considerably to the perceived juiciness and naturalness of the beverage.

The invention claimed is:

1. A citrus-flavoured beverage comprising a beverage base, citrus flavour and a citrus flavour-enhancing proportion of a mega-fatty complex, wherein the mega-fatty complex is present at a weight proportion of the citrus flavour of 0.005-0.02%, and the citrus flavour and the mega-fatty complex are present in the beverage at a weight proportion of 0.01-0.2%.

2. The citrus-flavoured beverage according to claim 1, in which the citrus flavour and mega-fatty complex are present in the beverage at a weight proportion of from 0.015-0.15% of the total beverage.

3. The citrus-flavoured beverage according to claim 1, in which the mega-fatty complex is present at a weight proportion of the citrus flavour of from 0.007-0.015%.

4. The citrus-flavoured beverage according to claim 3, in which the citrus flavour and mega-fatty complex are present in the beverage at a weight proportion of from 0.015-0.15% of the total beverage.

5. A method of preparing a citrus-flavoured beverage, comprising the addition to a beverage base of a citrus flavour and a citrus flavour-enhancing proportion of a mega-fatty complex, wherein the method comprises adding the mega-fatty complex at a weight proportion of the citrus flavour of 0.005-0.02%, and adding the citrus flavour and the mega-fatty complex to the beverage at a weight proportion of 0.01-0.2%.

6. The method according to claim 5, in which citrus flavour and mega-fatty complex are added to the beverage base at a weight proportion of 0.015-0.15% of the total beverage.

7. The method according to claim 5, in which the mega-fatty complex is added at a weight proportion of the citrus flavour of from 0.007-0.015%.

8. The method according to claim 7, in which citrus flavour and mega-fatty complex are added to the beverage base at a weight proportion of 0.015-0.15% of the total beverage.

* * * * *